United States Patent
Auer et al.

(10) Patent No.: US 9,304,753 B2
(45) Date of Patent: Apr. 5, 2016

(54) HANDLING DATA ACCESS REQUESTS IN COMPUTER PROGRAM UPDATES

(75) Inventors: Ulrich Auer, Hockenheim (DE); Hans-Juergen Lattrell, Reilingen (DE); Peter Schreiber, Wiesloch (DE)

(73) Assignee: SAP SE, Walldorf (DE)

( * ) Notice: Subject to any disclaimer, the term of this patent is extended or adjusted under 35 U.S.C. 154(b) by 550 days.

(21) Appl. No.: 12/494,781

(22) Filed: Jun. 30, 2009

(65) Prior Publication Data

US 2010/0332505 A1 Dec. 30, 2010

(51) Int. Cl.
*G06F 7/00* (2006.01)
*G06F 9/445* (2006.01)
*G06F 17/30* (2006.01)

(52) U.S. Cl.
CPC ............ *G06F 8/65* (2013.01); *G06F 17/30345* (2013.01)

(58) Field of Classification Search
CPC ................................................ G06F 17/30345
USPC .......................................................... 707/716
See application file for complete search history.

(56) References Cited

U.S. PATENT DOCUMENTS

| 7,421,450 | B1 * | 9/2008 | Mazzarella et al. | |
| 8,819,655 | B1 * | 8/2014 | Hopwood et al. | 717/168 |
| 2004/0054922 | A1 * | 3/2004 | Hiraga et al. | 713/200 |
| 2008/0154918 | A1 * | 6/2008 | Iwatsu et al. | 707/100 |

* cited by examiner

*Primary Examiner* — Ajith Jacob
(74) *Attorney, Agent, or Firm* — Schwegman Lundberg & Woessner, P.A.

(57) ABSTRACT

In an embodiment, a method is provided for updating a computer program. In this method, a record related to a data structure being effected in the updating of the computer program is identified. Here, the data structure is accessible by the computer program. Additionally, a request is received during the update of the computer program to access a further record related to the data structure. The further record in the request is identified to match the record effected in the updating of the computer program. The request is thereby prevented from accessing the further record related to the data structure based on the further record matching the record related to the data structure

19 Claims, 7 Drawing Sheets

HANDLING DATA ACCESS REQUESTS IN COMPUTER PROGRAM UPDATES

FIELD

The present disclosure relates generally to data access. In an embodiment, the disclosure relates to handling data access requests in computer program updates.

BACKGROUND

A computer program is often updated to fix program errors, to provide new or changed configuration settings, and/or to incorporate new functionalities. An update of a computer program may involve a variety of different update techniques. For example, the update may be in the form of applying a patch, which is a small piece of software designed to fix program errors. In another example, the update may be in the form of executing an import application, which may replace existing components of a computer program with new components.

During an update of one or more computer programs belonging to a system, there is a period of time where a system may show inconsistent data caused by the update. As an example, multiple computer programs accessing data from a database that is being updated may result in the creation of erroneous or corrupted application objects, such as erroneous bills of delivery, invoices, orders, and other application objects. A typical technique to avoid data corruption or inconsistent data is to prevent execution of the computer program or transactions during the update. However, a shutdown of a computer program may not be practical or even possible given that many business-critical computer programs, for example, must be accessible at all times.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for handling data access requests in the update of a computer program. In the update of a computer program, data accessed by the computer program may also be updated. A list of particular data effected in the update is identified. When a request to access a particular piece of data is received during the update, the piece of data in the request is compared to the list of data to identify whether the piece of data is effected in the update. As explained in more detail below, access to the particular piece of data is either prevented or permitted based on results from the comparison.

Figure 1:
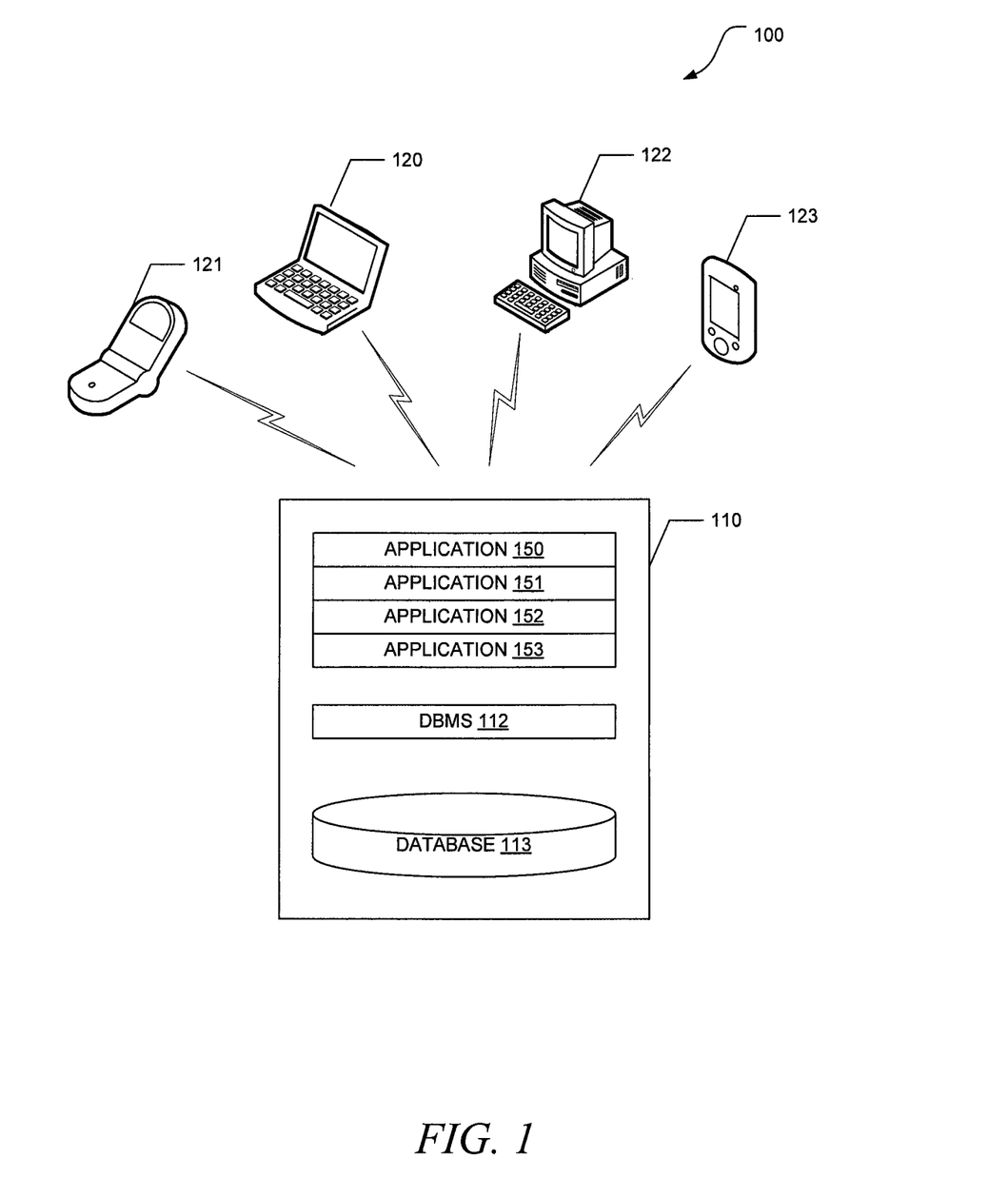
FIG. 1 depicts a block diagram of an example of a system, according to an embodiment, that is configured to handle data access requests in computer program updates.

FIG. 1 depicts a block diagram of an example of a system 100, according to an embodiment, that is configured to handle data access requests in computer program updates. The system 100 illustrates an example of a client-server database environment including a computing device 110 (e.g., an application/database server) and client devices 120-123. As an example, the system 100 may be an SAP system (e.g., SAP R/3 system) that is implemented in Advanced Business Application Programming (ABAP), which is a programming language created by the company SAP AG for developing applications (e.g., Web application servers). It should be appreciated that other system topologies may be used in conjunction with other embodiments. The computing device 110 may operate to receive, store, manage, and provide data, which may be received from sources such as client devices 120-123 and/or generated by the computing device 110.

The computing device 110 may include applications 150-153, a database management system (DBMS) 112, and a database 113. The applications 150-153 are computer programs that provide a variety of functionalities based on access of data stored in the database 113. For example, one or more of the applications 150-153 may provide order fulfillment, business monitoring, inventory control, online shopping, and/or any other suitable functions by way of interactions with other elements of the computing device 110, such as the database management system (DBMS) 112 and database 113. Generally, the database management system 112 may comprise any suitable system for managing a database instance. For example, the database management system 112 may receive requests for data (e.g., Structured Query Language (SQL) requests from one or more applications 150-153), retrieve requested data from the database 113, and return the requested data to one or more requestors (e.g., client devices 120-123).

The applications 150-153 communicate with database management system 112 over one or more interfaces provided by the database management system 112. The applications 150-153 may, in turn, support client applications executed by client devices 120-123. Such a client application may, for example, include a Web browser to access and display reports generated by the applications 150-153. In this regard, the computing device 110 may, for example, comprise a Web server to manage interactions with the client devices 120-123.

The database 113 is an example of a data structure. As used herein, a "data structure" provides context for the organization of data. Examples of data structures include databases, database tables, arrays, linked lists, indexes, and other data structures. In particular, a "database," such as the database 113, refers to one or more structured sets of persistent data.

An example of a database 113 is a single file containing many records. A "record," as used herein, refers to one or more pieces of data stored in a data structure. For example, a record may refer to a group of related fields, or a single field, treated as a unit and comprising part of the database 113. The database 113 may be a relational database that includes one or more database tables, where each database table refers to a single store of related information.

In the illustrative example of FIG. 1, one or more applications 150-153 may be updated. An "update," as used herein, refers to the creation, modification, and/or deletion of computer program code, other computer programs that depend on the updated computer program, or data used by the computer program. As an example of an update, one or more applications 150-153 may be patched to fix program errors. In another example of an update, new records may be added in the database 113, and components of the applications 150-153 may be replaced with new components that are configured to use the new records.

In accordance with embodiments of the present invention, applications 150-153 may continue to function and run, and thereby access some records in the database 113, during an update of one or more of the applications 150-153. Examples of data access operations include read data, add (or insert) data, delete data, modify (or update) data, and other data access operations. To maintain data consistency during the update, the database management system 112 or other components may, for example, identify whether a record being accessed is effected in the update process. As explained in detail below, if the record is effected in the updated process, then the database management system 112 can prevent the record from being accessed during the update process.

It should be appreciated that the computing device 110 may include other elements that are not shown and may be used during operation thereof, such as any suitable program code, scripts, or other functional data that is executable to interface with other elements of the system 100, other applications, other data files, operating system files, and device drivers. Furthermore, two or more elements of the system 100 may be located remote from one another and may communicate with one another via a network and/or a dedicated connection. Moreover, each displayed element of system 100 may comprise any number of hardware and/or software elements, some of which are located remote from each other element. The elements described herein as communicating with one another are directly or indirectly capable of communicating over any number of different systems for transferring data, including but not limited to shared memory communication, a local area network (LAN), a wide area network (WAN), a telephone network, a cellular network, a fiber-optic network, a satellite network, an infrared network, a radio frequency network, and any other type of network that may be used to transmit information between devices. Additionally, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
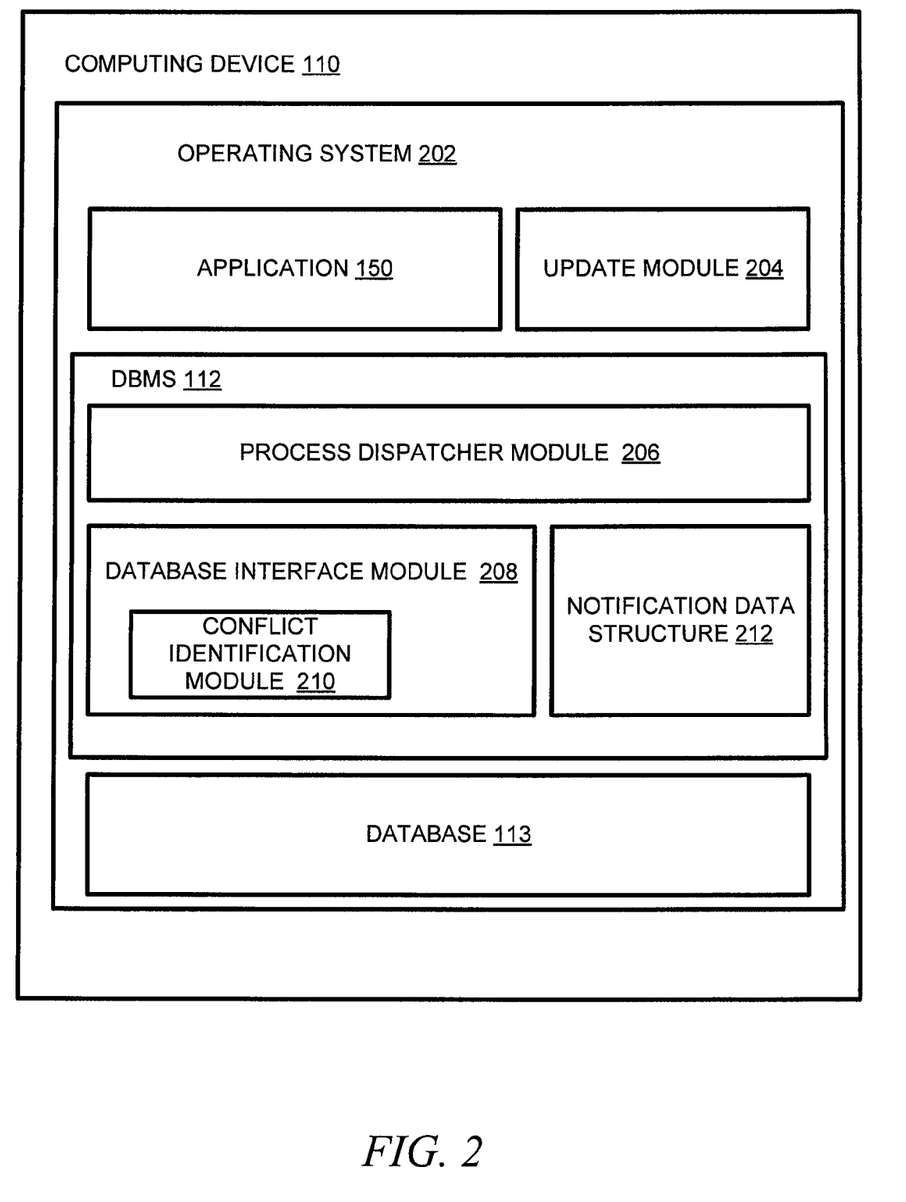
FIG. 2 depicts a detailed block diagram of the database management system, in accordance with an embodiment, included in a computing device.

FIG. 2 depicts a detailed block diagram of the database management system 112, in accordance with an embodiment, included in a computing device 110. It should be appreciated that the computing device 110 may be deployed in the form of, for example, a personal computer (PC), a laptop computer, a server computer, a tablet PC, a personal digital assistant (PDA), or other computing devices. The computing device 10 may be included in a client-server database environment. For example, the computing device 110 may form a part of the same computing device 10 depicted in FIG. 1 that hosts the database management system 112 and the database 113. Referring to FIG. 2, in various embodiments, the computing device 10 may be used to implement computer programs, logic, applications, methods, processes, or software to handle data access requests during updates, as described in more detail below.

The computing device 110 executes an operating system 202 that manages other software processes and/or services executing on the computing device 10. These software processes and/or other services may include an application 150, an update module 204, the database management system 112, and a database 113. Here, the update module 204 is configured to update the application 150. A patch is an example of an update module 204. An import application that is configured to import modified software components into a runtime system is another example of the update module 204. In the update of the application 150, the update module 204 may add, delete, and/or modify records in the database 113. For example, the update module 204 may update the application 150 to provide a new functionality, which may result in the addition of new records in the database 113. In another example, the update module 204 may update the application 150 to remove an existing functionality, which may result in the deletion of existing records associated with the obsolete, existing functionality. Other examples of records being effected in the update of the application 150 may include addition of one or more columns to a database table, addition of one or more rows to a database table, and modification of one or more records in a database table.

In the example depicted in FIG. 2, the database management system 112 includes a process dispatcher module 206, a database interface module 208, and a notification data structure 212. The notification data structure 212 is configured to store and define records, which are related to the database 113, identified by the update module 204 that are effected in the update of the application 150. The process dispatcher module 206 is configured to track whether and when an update process has started and/or has completed. As explained in more detail below, the process dispatcher module 206 may allow certain accesses to the database 113 based on this tracking.

The database interface module 208 may, for example, define a set of methods, variables, and conventions that provide a consistent database interface. In one embodiment, the database interface module 208 may include a conflict identification module 210. The conflict identification module 210 is configured to identify whether a record accessed by the application 150 is a record effected in the update process. As explained in more detail below, the conflict identification module 210 may use the list of effected records stored in the notification data structure 212 for the identification. Based on this identification, the conflict identification module 210 may prevent or permit access of the record.

It should be appreciated that in other embodiments, the database management system 112 may include fewer, more, or different modules apart from those shown in FIG. 2. For example, in an alternate embodiment, the conflict identification module 210 may be separate from the database interface module 208. In yet another embodiment, the notification data structure 212 may be included within the database interface module 208.

Figure 3:
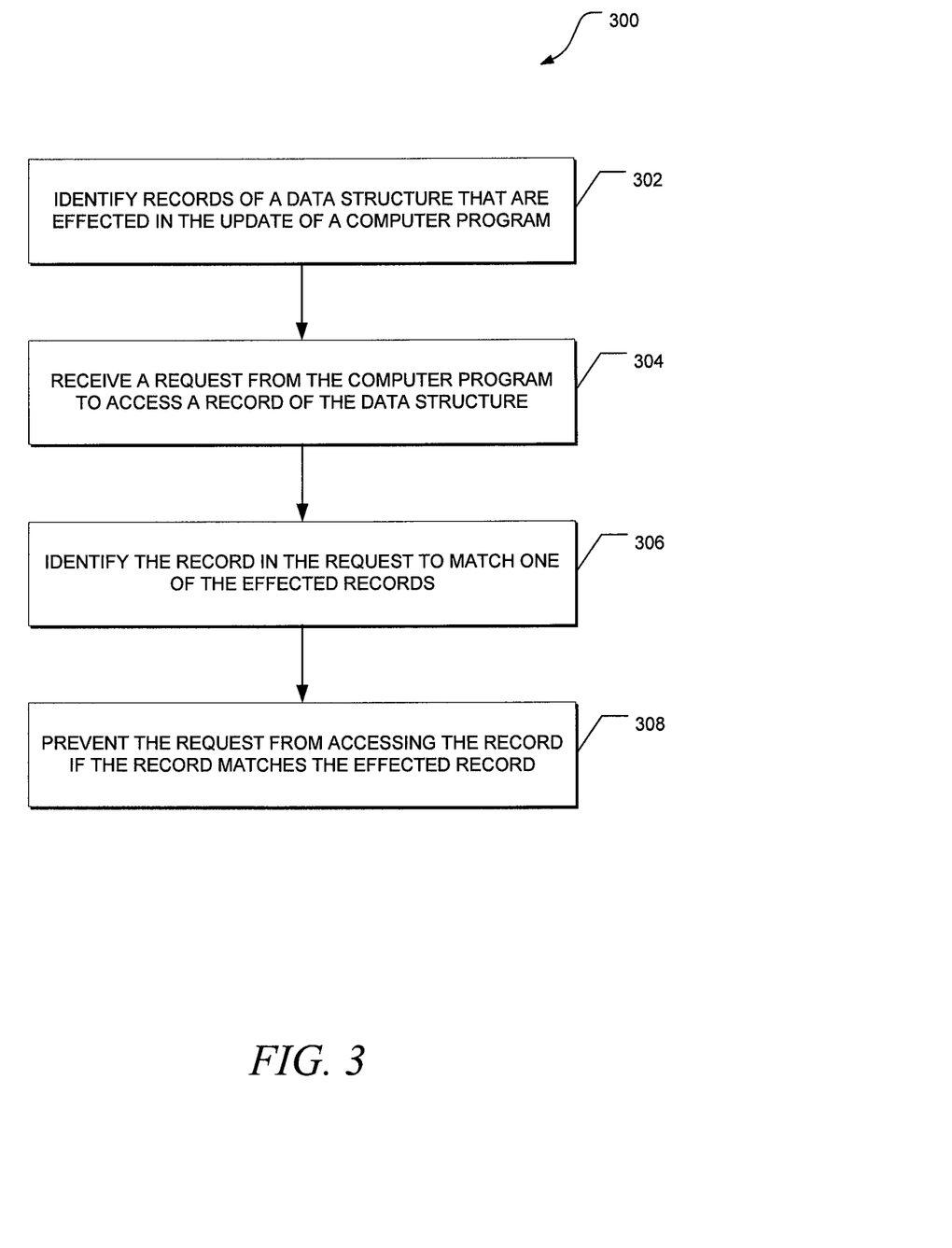
FIG. 3 depicts a flow diagram of a general overview of a method, in accordance with an embodiment, for handling data access requests during computer program updates.

FIG. 3 depicts a flow diagram of a general overview of a method 300, in accordance with an embodiment, for handling data access requests during computer program updates. In an embodiment, the method 300 may be implemented by the conflict identification module 210 and employed in the computing device 110 as depicted in FIG. 2. As depicted in FIG. 3, all the records related to a data structure that are effected in the update of a computer program are identified at 302. As explained in more detail below, in an embodiment, the identification may be made from a notification data structure, which stores a list of records effected in the update of the computer program.

As depicted at 304, a request is received during the update of the computer program to access at least one record related to the data structure. This request may be made by the same computer program that is being updated or by other computer programs in, for example, a client-server database environment. During the update, the execution of the computer program being updated (and also other computer programs in the system) does not need to be terminated. That is, the computer programs may continue to execute and run during the update of one of the computer programs.

Upon receipt of the request, an identification is made at 306 that the record in the request matches one of the records effected in the update. In effect, for example, a match of the records may identify the request is requesting access to a record that currently does not exist, but will be added to the data structure in the update. Alternatively, a match of the records may identify the request is requesting access to an existing record that will be deleted from the data structure in the update.

Once a match is identified, the request may be prevented from accessing the record at 308. In effect, embodiments of the invention prevent access to records that are effected in the update, thereby, for example, maintaining data consistency during the update. For example, a computer program is prevented from accessing records that are to be deleted in the update, thereby, for example, preventing the data being stored in invalid records, and also retrieving (and using) data that will be obsolete or invalid as a result from the update.

Figure 4:
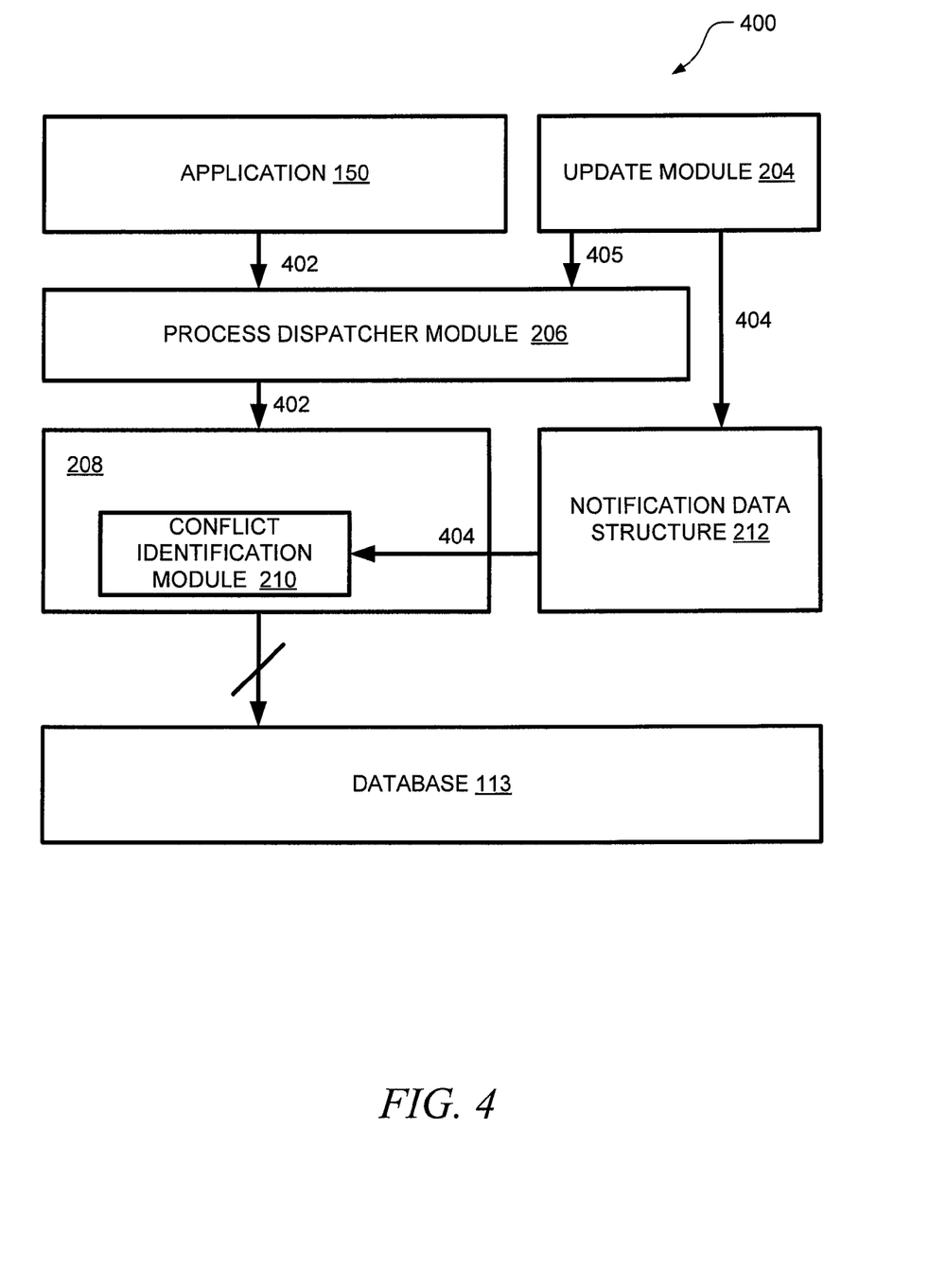
FIG. 4 depicts a block diagram of a system, consistent with one embodiment, illustrating an example of a computer program update.

FIG. 4 depicts a block diagram of a system 400, consistent with one embodiment, illustrating an example of a computer program update. The system 400 includes an application 150, an update module 204, a process dispatcher module 206, a database interface module 208 that includes a conflict identification module 210, a notification data structure 212, and a database 113, which is accessible by the application 150. In this example, the system 400 may be a part of an order procurement system and the application 150 can be a computer program that displays error messages during the order procurement process. When another application (not shown) requests an error message to be displayed, it transmits an error code to the application 150 and, in turn, the application 150 translates the error code into an error message and displays the error message as, for example, a pop-up message. The error codes and their corresponding error messages are stored in the database 113. The following Table A provides an example of the database 113 with a list error codes and their corresponding error messages.

TABLE A

| Error Codes | Error Messages |
|---|---|
| T101 | Inventory mismatch |
| T108 | Data corruption |
| T870 | Invalid input |
| T328 | Insufficient inventory |

To update the application 150 with modified and new error messages, for example, the update module 204 in the form of an import application is loaded and executed. The update module 204 includes a list of one or more records 404 that are to be added and/or deleted in the update. Each record in the list may be identified by an identifier, which refers to a value (numeric and/or textual) that uniquely identifies a record. For example, the identifier may be a column name of a database table in the database 113 identifying a particular column of records. In another example, the identifier may be a row name or key value of a database table identifying a particular row of records. In yet another example, the identifier may be a combination of column names and row names that identify a group of records in the database table. The update module 204 may define the list of records 404 in a file, and this file may be accessed to identify the list of records 404 to be temporarily stored in the notification data structure 212. The following Table B provides an example of the notification data structure 212 with a list of records 404 that are to be added and/or deleted in the update.

TABLE B

| Table Name | Row Identifiers |
|---|---|
| Error Message Translation Table 1 | T* |
| Error Message Translation Table 1 | T101 |
| Error Message Translation Table 1 | T108 |
| Error Message Translation Table 2 | * |

As depicted in Table B, the notification data structure 212 includes a column that identifies the particular tables in the database 113 and a corresponding column that identifies the rows in a particular table to be effected in the update. In this example, the row identifiers are the row names of a table. The row identifiers can specifically identify a single row (e.g., T101 or T108). Alternatively, the row identifiers can also generally identify multiple rows with an asterisk symbol (*), which is a wildcard character. The row identifier "*" selects all rows of a particular table while the row identifier "T*" selects all row names that starts with a character "T."

During the update, the application 150 transmits a request 402 to access a particular record in the database 113. The process dispatcher module 206 receives the request 402 and, in one embodiment, queries the update module 204 to identify whether the update of the application 150 has started (or completed). In an alternate embodiment, the update module 204 may automatically transmit a notification 405 to the process dispatcher module 206 that the update has started (or completed). The start, completion, and other statuses or timings associated with the update are tracked by the import module, and the import module can provide such statuses to both the process dispatcher module 206 and the conflict identification module 210. If the process dispatcher module 206 identifies that the update process has not started, then the process dispatcher module 206 may directly forward or dispatch the request 402 to the database 113 by way of the database interface module 208, bypassing the conflict identification module 210.

On the other hand, if the process dispatcher module 206 identifies that the update process has started, then request 402 is dispatched to the conflict identification module 210, which is included in the database interface module 208. The conflict identification module 210 accesses the list of records 404 effected in the update process from the notification data structure 212. With the list of records 404, the conflict identification module 210 identifies whether the requested record matches a record in the list of records 404 by, for example, comparing the requested record against the list of records 404 retrieved from the notification data structure 212.

If the comparison does not identify a match with any record in the list of records 404, then the database interface module 208 permits the request to access the requested record in the database 113 because, for example, the requested record does not conflict with records that are effected in the update process. For example, a mismatch can indicate that the requested record is safe to access because this requested record will not be deleted in the update process.

On the other hand, if the comparison identifies a match, then the database interface module 208 prevents the request from accessing the requested record in the database 113. In an embodiment, the database interface module 208 can prevent access by suppressing any execution of data access commands associated with a requested record. Alternatively, the database interface module 208 can prevent access by aborting the request 402 to access that requested record. As discussed above, the database interface module 208 prevents access based on the match to maintain, for example, data consistency during the update of the application 150. As a result, for this example, the interception and filtering of the request 402 by the database interface module 208 prevent erroneous or obsolete error messages from being displayed by the application 150 during its update.

Figure 5:
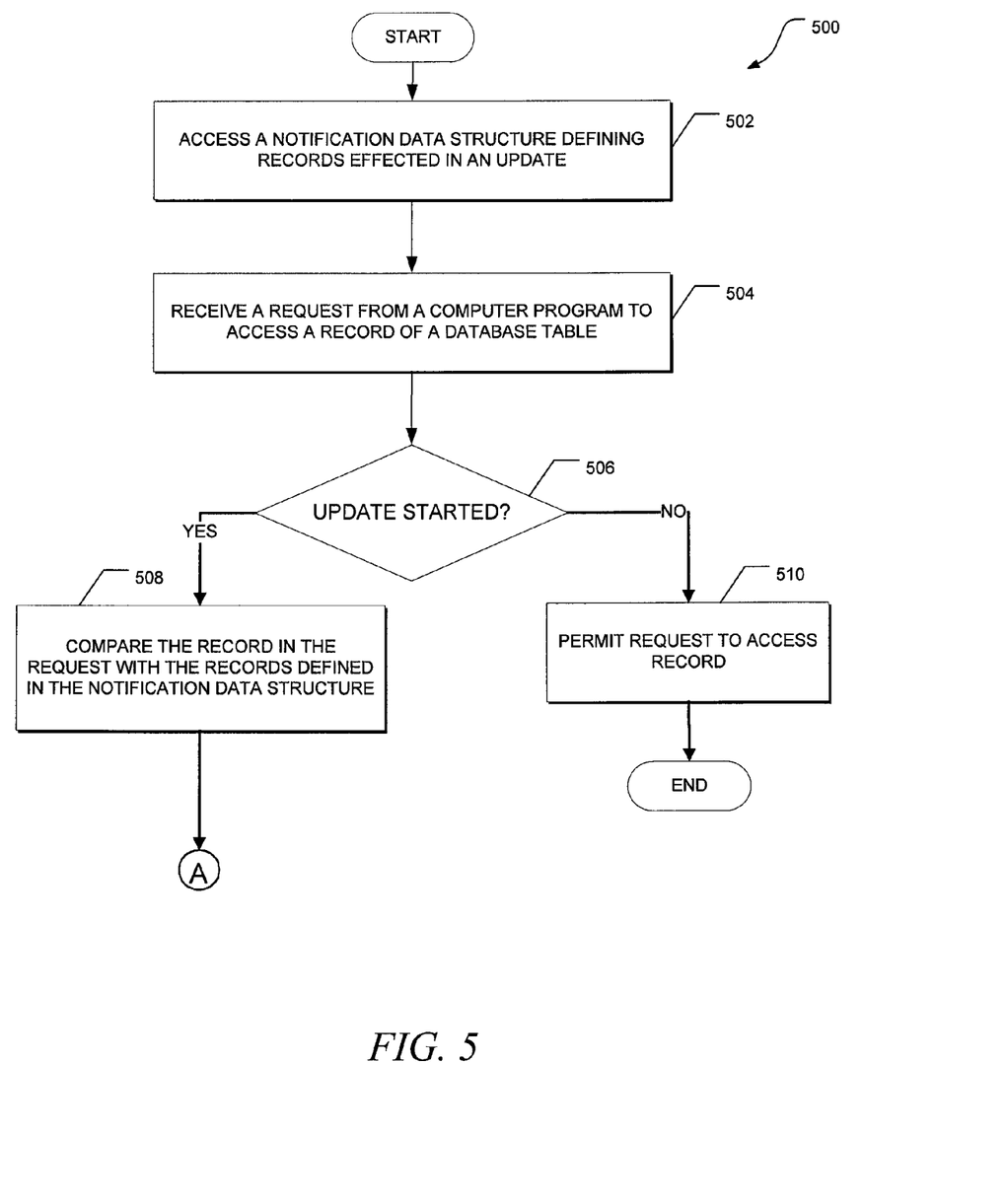
FIG. 5 depicts a flow diagram of a detailed method, in accordance with an embodiment, for handling data access requests during computer program updates.

FIG. 5 depicts a flow diagram of a detailed method 500, in accordance with an embodiment, for handling data access requests during computer program updates. In an embodiment, the method 500 may be implemented by the database management system 112 and employed in the computing device 110 as depicted in FIG. 2. As depicted in FIG. 5, a conflict identification module, for example, accesses at 502 a notification data structure that defines a list of records in one or more database tables effected in an update of a computer program. The list of records may include, for example, new records to be added, existing records to be modified, and/or existing records to be deleted in the update of the computer program.

The database management system may then receive a request at 504 from a computer program to access a particular record related to a database table. In this example, a process dispatcher module queries an update module to identify at 506 whether an update of the computer program has started. If the update has not started, then the process dispatcher module permits the request to access the record at 510. In one embodiment, the process dispatcher module can permit the request to access the record by disabling the conflict identification module, which identifies whether the requested record matches any of the records defined in the notification data structure, as explained in more detail below.

On the other hand, if the update has started, then the process dispatcher module forwards the request to a conflict identification module that, as depicted at 508, identifies whether the requested record matches the list of records defined in the notification data structure by comparing the requested record with the list of records. In reference to 512, if a match is not identified between the requested record and any record in the list of records, then the request is permitted to access the requested record at 520. In this example, access is permitted because even though the update has started, the request is accessing existing records that are not effected in the update.

If a match is identified at 512, then the conflict identification module at 514 identifies whether an application or other computer program transmitted the request before or after a start of the update. The conflict identification module 210 can make the identification based on, in part, the status of the update, which can be provided by the update module 204 as discussed above. If the request is identified as being transmitted before the start of the update, then the request is prevented from accessing the record at 518. The request is prevented from accessing the record at this time because, for example, access of effected records during the update period by applications that have not been updated may result in data inconsistencies. That is, the conflict identification module can identify that the request is made from an "old" transaction, which is a transaction that was running before the start of the update, and it may potentially request to access obsolete or "old" data. Upon identification of the request originating from such an "old" transaction, the conflict identification module may prevent the request from accessing the record. As described in more detail below, when the last "old" transaction is finished, the conflict identification module may be disabled.

Still referring to FIG. 5, if the request is identified as being transmitted after the start of the update, then another identification is made at 516 to identify whether the update has completed. Again, the import module can provide the status of the update. If the update is completed, then the database management system at 520 permits the request to access the record because, for example, the applications and associated records have been effectively updated, and therefore, access to such records is safe at this point. On the other hand, if the update is identified as being not completed, then the database management system prevents the request from accessing the record at 518.

After completion of the update, the conflict identification module 210 may be disabled, which effectively disables the identification based on the comparison of the records. The notification data structure may then be cleared of the list of records for the current or most recent update because this current list is not relevant to future updates, which may effect a different set of records.

Figure 6:
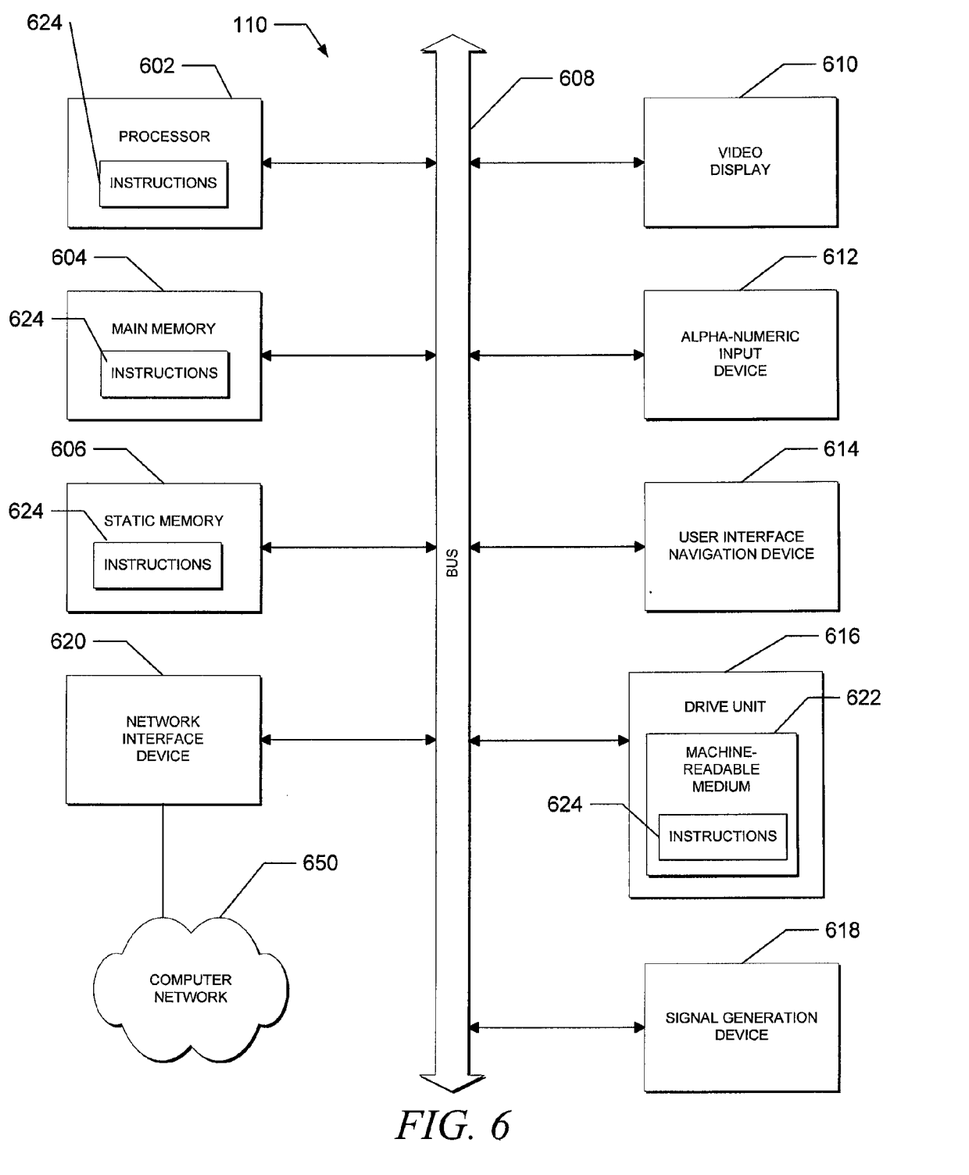
FIG. 6 depicts a block diagram of a machine in the example form of a computing device within which may be executed a set of instructions for causing the machine to perform any one or more of the methodologies discussed herein.

FIG. 6 depicts a block diagram of a machine in the example form of a computing device 110 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 110 includes a processor 602 (e.g., a central processing unit (CPU), a graphics processing unit (GPU) or both), a main memory 604 (e.g., random access memory (a type of volatile memory)), and static memory 606 (e.g., static random access memory (a type of volatile memory)), which communicate with each other via bus 608. The computing device 110 may further include video display unit 610 (e.g., a plasma display, a liquid crystal display (LCD) or a cathode ray tube (CRT)). The computing device 110 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by computing device 110, with the main memory 604 and processor 602 also constituting machine-readable, tangible media.

The data structures and instructions 624 may further be transmitted or received over a computer network 650 via network interface device 620 utilizing any one of a number of well-known transfer protocols (e.g., HTTP).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 110) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processor or processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for handling data access requests may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method of updating a computer program, the method comprising:
   obtaining an identification of a plurality of record related to a data structure, the plurality of records being effected in the updating of the computer program, the data structure being accessible by the computer program;
   receiving a request during the updating of the computer program to access a further record related to the data structure;

determining whether the further record in the request matches at least one of the plurality of records effected in the updating of the computer program; and preventing the request from accessing the further record based on the determination of the further record matching the at least one of the plurality of records.

2. The computer-implemented method of claim 1, wherein the prevention of the further request from accessing the record comprises suppressing execution of a data access command associated with the request.

3. The computer-implemented method of claim 1, further comprising:

receiving an additional request during the updating of the computer program to access an additional record related to the data structure;

determining whether the additional record in the additional request mismatching all of the plurality of records effected in the updating of the computer program; and permitting the additional request to access the additional record based on a determining of the mismatching of all of the plurality of records.

4. The computer-implemented method of claim 1, further comprising:

identifying the request being transmitted after a start of the updating of the computer program;

identifying the updating of the computer program as being completed; and permitting the request from the computer program to access the further record based on the request being transmitted after the start of the updating, the further record matching at least one of the plurality of records, and the updating of the computer program as being completed.

5. The computer-implemented method of claim 1, further comprising:

identifying a completion of the updating of the computer program; and disabling the determining whether the further record in the request to match at least one of the plurality of records based on the completion of the updating of the computer program.

6. The computer-implemented method of claim 1, wherein the execution of the computer program is not terminated during the updating of the computer program.

7. The computer-implemented method of claim 1, wherein the data structure is a database table, and wherein the plurality of records being effected are added to the database table.

8. The computer-implemented method of claim 1, wherein the data structure is a database table, and wherein the plurality of records being effected are deleted from the database table.

9. The computer-implemented method of claim 1, wherein the data structure is a database table, and wherein the plurality of records being effected relates to an addition of a column to the database table.

10. The computer-implemented method of claim 1, wherein the data structure is a database table, and wherein the plurality of records being effected are modified in the database table.

11. A non-transitory machine-readable storage medium that stores instructions, which, when performed by a machine, cause the machine to perform operations comprising:

accessing a data structure defining a plurality of records related to a database table, the plurality of records being effected in an update of a computer program, the database table being accessible by the computer program during execution of the computer program;

receiving a request from the computer program to access a record related to the database table during the update of the computer program;

comparing the record in the request with the plurality of records related to the data structure;

determining whether the record in the request matches at least one of the plurality of records based on the comparison; and preventing the request from accessing the record based on a determination of the record matching the at least one of the plurality of records.

12. The machine-readable medium of claim 11, further comprising:

accessing a file that defines the plurality of records related to the database table, the file being included in an update module that is configured to update the computer program; and storing the plurality of records in the data structure.

13. The machine-readable medium of claim 11, further comprising:

identifying the request being transmitted after a start of the update of the computer program;

identifying the update of the computer program as being completed; and permitting the request from the computer program to access the record related to the database table based on the request being transmitted after the start of the update, the record matching the at least one of the plurality of records, and the update of the computer program as being completed.

14. The machine-readable medium of claim 11, further comprising:

identifying a completion of the update of the computer program; and disabling the comparing of the record in the request with the plurality of records based on the completion of the update of the computer program.

15. The machine-readable medium of claim 11, further comprising:

receiving an additional request from the computer program to access an additional record related to the database table during the update of the computer program;

comparing the additional record in the additional request with the plurality of records defined in the data structure;

determining whether the additional record in the request mismatches all of the plurality of records related to the database table; and permitting the additional request from the computer program to access the additional record related to the database table based on a determining of the mismatching of all of the plurality of records.

16. A computing device comprising:

at least one processor; and a memory in communication with the at least one processor, the memory being configured to store a conflict identification module that is executable by the at least one processor, the conflict identification module having instructions that when executed by the at least one processor, cause operations to be performed, the operations comprising:

obtaining an identification of a plurality of records related to a database table, the plurality of records being effected in an update of a computer program, the database table being accessible by the computer program;

receiving a request to access a further record related to the database table;

determining whether the further record in the request matches at least on of the plurality of records effected in the update of the computer program; and preventing the request from accessing the further record related to the database table based on a determination of the further record matching the at least one of the plurality of records related to the database table.

17. The computing device of claim 16, wherein the conflict identification module has instructions that when executed by the at least one processor, cause operations to be performed, the operations further comprising:

receiving an additional request to access an additional record related to the database table;

determining whether the additional record in the request mismatches all of the plurality of records effected in the update of the computer program; and permitting the additional request from the computer program to access the additional record related to the database table based on a determination of the mismatching of all of the plurality of records.

18. The computing device of claim 16, wherein the memory is further configured to store a process dispatcher module that is executable by the at least one processor, the process dispatcher module having instructions that when executed by the at least one processor, cause operations to be performed, the operations comprising:

identifying the request being transmitted after a start of the update of the computer program;

identifying the update of the computer program as being completed; and permitting the request from the computer program to access the further record based on the request being transmitted after the start of the update, the further record matching the at least one of the plurality of records, and the update of the computer program as being completed.

19. The computing device of claim 16, wherein the memory is further configured to store a process dispatcher module that is executable by the at least one processor, the process dispatcher module having instructions that when executed by the at least one processor, cause operations to be performed, the operations comprising:

identifying a completion of the update of the computer program; and disabling the identification of the further record in the request matching the at least one of the plurality of records based on the completion of the update of the computer program.

\* \* \* \* \*